United States Patent
Motomatsu

(10) Patent No.: US 7,701,547 B2
(45) Date of Patent: Apr. 20, 2010

(54) MANUFACTURING METHOD OF A LIQUID CRYSTAL DISPLAY PANEL, AND A LIQUID CRYSTAL DRIPPING DEVICE USED THEREFOR

(75) Inventor: Toshihiko Motomatsu, Kawasaki (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 1113 days.

(21) Appl. No.: 11/261,471

(22) Filed: Oct. 31, 2005

(65) Prior Publication Data

US 2006/0092371 A1 May 4, 2006

(30) Foreign Application Priority Data

Nov. 2, 2004 (JP) .............................. 2004-318692

(51) Int. Cl.
*G02F 1/1341* (2006.01)
(52) U.S. Cl. ....................................... 349/189; 349/187
(58) Field of Classification Search ........................ None
See application file for complete search history.

(56) References Cited

U.S. PATENT DOCUMENTS

| 3,837,890 A | * | 9/1974 | Sumner et al. ................ 8/444 |
| 6,095,203 A | * | 8/2000 | Yamamoto et al. ............ 141/59 |
| 2003/0159582 A1 | * | 8/2003 | Kweon et al. ................. 95/266 |

2004/0182887 A1  9/2004 Sugimura et al.

FOREIGN PATENT DOCUMENTS

| CN | 1379699 | 11/2002 |
| CN | 1441291 | 9/2003 |
| JP | 9-80452 | 3/1997 |
| JP | 11-131063 | 5/1999 |
| JP | 2002-356669 | 12/2002 |
| JP | 2003-295145 | 10/2003 |
| JP | 2003-322836 | 11/2003 |
| WO | 01/14062 | 3/2001 |

OTHER PUBLICATIONS

Office Action from Chinese Patent Office issued on Jul. 27, 2007.

* cited by examiner

*Primary Examiner*—Dung Nguyen
*Assistant Examiner*—Lucy P Chien
(74) *Attorney, Agent, or Firm*—Young & Thompson

(57) ABSTRACT

A manufacturing method of the liquid crystal display panel and a liquid crystal dripping device for the liquid crystal dripping and panel pasting method, by which residual moisture, gas constituents, and foreign substances mixed in the liquid crystal can be removed assuredly, and an occurrence of display fault can be suppressed, and can also improve display quality and a yield of the liquid crystal display panel, is provided. In this manufacturing method, prior to drip the liquid crystal on the substrate, pre-treatments, which combines suitably vacuum treatment which removes residual moisture and gas constituents from the liquid crystal maintaining the liquid crystal in a reduced pressure environment, filtration treatment which removes foreign substances from the liquid crystal, and heat treatment which heats the liquid crystal as required for carrying out distributed removal of the organic substances, are performed.

3 Claims, 7 Drawing Sheets

LIQUID CRYSTAL DRIPPING DEVICE

FIRTRATION TREATMENT DEVICE

LIQUID CRYSTAL DRIPPING DEVICE

LIQUID CRYSTAL DRIPPING DEVICE

MANUFACTURING METHOD OF A LIQUID CRYSTAL DISPLAY PANEL, AND A LIQUID CRYSTAL DRIPPING DEVICE USED THEREFOR

BACKGROUND OF THE INVENTION

1. Field of the Invention

A present invention relates to a manufacturing method of a liquid crystal display panel, and its manufacturing apparatus. In particular, it relates to a manufacturing method of a liquid crystal display panel using a liquid crystal dripping and panel pasting method, and a liquid crystal dripping device to be used for the method.

2. Description of the Related Art

Since it has advantages, such as thin shape, light weight, and low power consumption, the liquid crystal display panel is widely used as a display of AV equipment or OA equipment.

The liquid crystal display panel is sandwiching the liquid crystal between a pair of substrates disposed face to face each other. The liquid crystal display panel provides a pair of electrodes, and controls an alignment direction of a liquid crystal molecule by the electric field generated between electrodes. The liquid crystal display panel displays images by modulating the light irradiated through the liquid crystal display panel in the alignment direction of the controlled liquid crystal molecule.

In the manufacturing method of the liquid crystal display panel, there is a method generally named a liquid crystal filling method as a method of filling the liquid crystal between the pair of substrates disposed face to face each other. The liquid crystal filling method has the following typical methods.

One method is a dipping method for filling the liquid crystal by using pressure difference in a vacuum chamber. In this method, an alignment and pasting of the pair of substrates are to be performed. For pasting each substrate which opposes together, a sealing material is applied on the surface of the substrate except for the area used as a liquid crystal filling port, and the pair of substrates pasted together is called "a cell". Then, this cell is put into the vacuum chamber and the pressure inside of the vacuum chamber is decreased to a low pressure state. Next, the liquid crystal filling port of the cell is dipped into the liquid crystal, and returning the pressure of the inside of the vacuum chamber to an atmosphere pressure state. Then, the liquid crystal is sucked up inside of the cell by pressure difference.

In another method, the cell is provided with two ports, a filling port and an exhausting port. The filling port is dipped into the liquid crystal and air inside of the cell is exhausted from the exhausting port, and as the result, the liquid crystal is sucked up inside of the cell by pressure difference.

An example of the manufacturing method of the liquid crystal display panel by the liquid crystal filling method is described with reference to FIG. 7.

FIG. 7 is a flow diagram showing a part of manufacturing process of the liquid crystal display panel by the conventional liquid crystal filling method.

As a pair of substrates to be used for the cell, a TFT substrate on which switching elements, such as TFT (Thin Film Transistor), are formed in matrix form, and another substrate as a counter substrate on which a color filter and a black matrix are formed are used, and processes are to fill the liquid crystal inside of the cell.

First, by using a printer, provide coating of solution of polyimide, as a material of an alignment layer, on a surface of the TFT substrate and also on a surface of the counter substrate, then performs pre-baking using heating equipment such as a hot plate oven or an IR oven. After pre-baking, performs main baking for carrying out heating dehydration condensation of the polyimide coating film, and forms the alignment layer of uniform thickness (S710, S720).

Next, rubbing process is to be performed for respective alignment layers on both substrates by a rubbing roller which rubs over the surface of the alignment layer in a same direction by a rubbing cloth (S711, S721).

More over, in order to remove the residue on the surface of the substrate, respective substrates are washed by ultrasonic cleaning, jet spray cleaning, which uses warm ultra-pure water or an alcohol. Then, puts the substrates into a drying equipment and dries the substrates with a hot blast circulation or an infrared heating (S712, S722).

Next, using a screen printing method with a heat curing resin, forms the seal patterning for specifying an area, in which the liquid crystal is to be filled, except for a portion of the liquid crystal filling port on one of the substrates of the pair, (it is assumed that the TFT substrate is used for this substrate as an example), and after this, an AG coating is applied (S713, S714).

Spray spacers, such as polymer beads or silica beads, on the other substrate of the pair substrates by a spacer sprayer with a wet type method or a dry type method, and makes them fix (S723, S724).

Next, carries out panel alignment for both substrates of the pair which have performed the above-mentioned processing, and pastes them together (S730).

The substrates of the pair pasted together are pressed from both outsides, the seal material is to be crushed, and a desired gap between two substrates is formed, then the substrates are baked at a predetermined temperature (S731).

Thus, after seal baking process, cuts the substrates of the pair in a predetermined portion of the outside of the seal material (S732).

Next, after drying the substrates of the pair pasted together (S733), holds the substrates in a vacuum system, and decompresses the inside of the vacuum system, which causes a space produced in a gap part between the substrates being decompressed.

Then, the liquid crystal filling port of the substrates pasted together is dipped into liquid crystal, and after dipping, returns the inside of the vacuum system back to the atmosphere pressure state. By this process, the liquid crystal is filled in the gap part between substrates by pressure difference (S734).

After the liquid crystal has been filled in the gap, ultraviolet curing resin is poured into the liquid crystal filling port for end sealing. An ultraviolet rays is glared for curing ultraviolet curing resin to provide end sealing of the liquid crystal filling port, and a liquid crystal display panel (S735) is formed.

The liquid crystal filling method which was mentioned above has such disadvantages as taking long time for filling the liquid crystal through very small liquid crystal filling port (a tiny hole), and requiring a large amount of liquid crystal for dipping the liquid crystal filling port into liquid crystal.

Therefore, another method called a liquid crystal dripping and panel pasting method is used in recent years.

The liquid crystal dripping and panel pasting method applies the seal material to one substrate, drips liquid crystal onto the substrate and pastes another substrate on it in an ordinary atmosphere or a decompressed atmosphere state. It is the method of stiffening the seal material by pressurization or a pressure difference between decompressed atmosphere state and normal atmosphere state. This liquid crystal dripping and panel pasting method can shorten working hours substantially since the liquid crystal is directly dripped on the substrate. Also, it has an advantage of reducing amount of costly liquid crystal because a necessary minimum liquid crystal is enough to be used.

With reference to FIG. 8, the liquid crystal dripping and panel pasting method which drips the liquid crystal under ordinary atmosphere state will be described.

FIG. 8 is a figure of flow showing a part of manufacturing process of the liquid crystal display panel by the conventional liquid crystal dripping and panel pasting method.

Similarly with the case of the liquid crystal filling method, first, by using a printer, provide coating of solution of polyimide on a surface of the TFT substrate and also on a surface of the counter substrate, then performs pre-baking using heating equipment such as a hot plate oven or an IR oven. After pre-baking, performs main baking for carrying out heating dehydration condensation of the polyimide coating film, and forms the alignment layer of uniform thickness (S810, S820).

After carrying out pre-baking and main baking and forming the alignment layer of uniform thickness, rubbing process for the respective alignment layers on both substrates is to be performed by a rubbing roller which rubs over the surface of the alignment layer in a same direction by a rubbing cloth (S811, S821).

And in order to remove the residue on a surface of a substrate, washes both substrates and makes them dry (S812, S822).

Next, using the screen printing method or the dispenser drawing method, forms the seal patterning with the ultraviolet curing resin or the heat curing resin on one of the substrates of the pair, (it is assumed that the TFT substrate is used for this substrate as an example), and after this, an AG coating is applied (S813, S814).

Spray spacers, such as polymer beads or silica beads, on the other substrate (a counter substrate) of the pair substrates by a spacer sprayer with a wet type method or a dry type method, and makes them fix (S824). Then, necessary amount of the liquid crystal is dripped in a viewing area surrounded by the seal material of one substrate (here TFT substrate) using a dispenser for liquid crystal dripping under ordinary pressure (S815).

Next, after fixing spacers on the counter substrate and dripping the liquid crystal on the TFT substrate respectively, the panel alignment is performed for both the substrates of the pair, and pastes them together (S830).

Then, the pair of substrates pasted together is pressed from both outsides, the seal material is to be crushed, and a desired gap between two substrates is formed. After this, the ultraviolet ray is glared from rear side of the substrate (here TFT substrate) for pre-curing the seal material (S831), then bakes at predetermined temperature for actual curing the seal material (S832). And, cuts the substrates of the pair in a predetermined portion of the outside of the seal material (S833), and the liquid crystal display panel is formed.

Thus, the liquid crystal display panel manufactured as above controls display indication by the liquid crystal sandwiched by the gap between the substrates of the pair pasted together. Therefore, if air bubbles mix into the liquid crystal, the thickness of the liquid crystal layer will change and display fault will occur.

As a method for improving an occurrence of the display fault which is caused by such air bubbles, there is the technology disclosed in JP,9-80452,A, for example. The manufacturing method of the liquid crystal device which performs a degassing treatment (vacuum treatment) for removing the gas currently mixed into the liquid crystal composition is disclosed in JP,9-80452,A. This method realizes the degassing treatment prior to carrying out the liquid crystal filling process by leaving the liquid crystal composition as is under the pressure environment below an atmosphere. By performing such vacuum treatment, residual moisture, gas constituents, etc. causing air bubbles are removed from the liquid crystal.

However, it is also to be considered that not only as for residual moisture or gas constituents but solid-state components such as dusts cause the display fault, and hereafter, solid-state component other than the composite of the liquid crystal calls a foreign substance.

In manufacturing the liquid crystal display panel using the liquid crystal filling method mentioned above, even if foreign substances, such as dusts, mix in the liquid crystal, it does not become a problem because a foreign substance having a size more than a diameter of a hole of liquid crystal filling port for pouring a liquid crystal is removed.

However, in manufacturing the liquid crystal display panel by using the liquid crystal dripping and panel pasting method, since the liquid crystal is directly dripped on a substrate, foreign substances mixed into the liquid crystal will be incorporated in a gap as they are. And when the foreign substance of size, which cannot be disregarded compared with the gap between the substrates, is mixed, display faults, such as a bright defect (what is also called a luminous dot) by which a bright dot is recognized visually, will occur, and it causes the problem of low display quality and the low yield in manufacturing.

On the other hand, the method of performing filtration treatment which removes foreign substances in the step of mixing and refining the liquid crystal composition using the filter of a predetermined bore diameter is disclosed, for example, by JP,11-131063,A, JP,2003-322836,A.

However, even if foreign substances were removed by the filtration treatment at the time of a liquid crystal refinement, foreign substances may newly mix in other process of the liquid crystal manufacturing, such as a delivery examination at the time of delivering the refined liquid crystal, a step which subdivides a liquid crystal into small containers for transportation, and a step which packs the subdivided containers. In work environment, foreign substances may also mix in some processes of manufacturing the liquid crystal display panel, such as a step of transfer the liquid crystal from subdivided container to another container for liquid crystal dripping, a step of a vacuum treatment, and a step of a liquid crystal dripping step.

Thus, the method of manufacturing the liquid crystal display panel of high quality is required, in which the foreign substances which may be mixed in the manufacture process of the liquid crystal, or the manufacture process of the liquid crystal display panel are assuredly removed for manufacturing the liquid crystal display panel which sandwiched the liquid crystal to the substrates of the pair.

SUMMARY OF THE INVENTION

The present invention is made in view of the above-mentioned problem, and the main purpose of the invention is to provide a manufacturing method of the liquid crystal display panel for the liquid crystal dripping and panel pasting method which drips the liquid crystal onto one side of the substrate of a pair, and pastes both substrates together using a sealing material, and a liquid crystal dripping device to be used for the method.

According to the present invention, the manufacturing method of the liquid crystal display panel and the liquid crystal dripping device to be used for the manufacturing method, by which residual moisture, gas constituents, and foreign substances mixed in the liquid crystal can be removed assuredly, an occurrence of display fault can be suppressed, and can also improve display quality and a yield of the liquid crystal display panel, can be realized.

According to the constitution of the present invention, prior to drip the liquid crystal on the substrate, pre-treatments, which combines suitably vacuum treatment which removes residual moisture and gas constituents from the liquid crystal maintaining the liquid crystal in a reduced pressure environment, filtration treatment which removes foreign substances from the liquid crystal, and heat treatment which heats the liquid crystal as required for carrying out distributed removal of the organic substances, is performed.

And also, by driving a liquid crystal discharging unit of the liquid crystal dripping device in a pure gas atmosphere environment, in which moisture and foreign substances have been removed, at the time of the liquid crystal dripping process, contamination of new foreign substances can be prevented.

Foreign substances mixed in the liquid crystal, can assuredly be removed also by providing a filter unit in a transportation route of the liquid crystal between a container which stores the liquid crystal inside the liquid crystal dripping device, and a nozzle which drips the liquid crystal on a substrate (preferably, to be provided between the liquid crystal discharging unit which carry out discharging of a fixed quantity of liquid crystal and the container).

In filtration treatment, the filter unit provided with a filter of predetermined bore diameter only, or the filter of predetermined bore diameter with an ion adsorbing member is used.

According to these effects, the manufacturing method of the liquid crystal display panel and the liquid crystal dripping device according to the present invention can suppress an occurrence of display faults, such as an luminous dot or bright defect, and can improve display quality and the yield to it.

DESCRIPTION OF THE EXEMPLARY EMBODIMENTS

Figure 1:
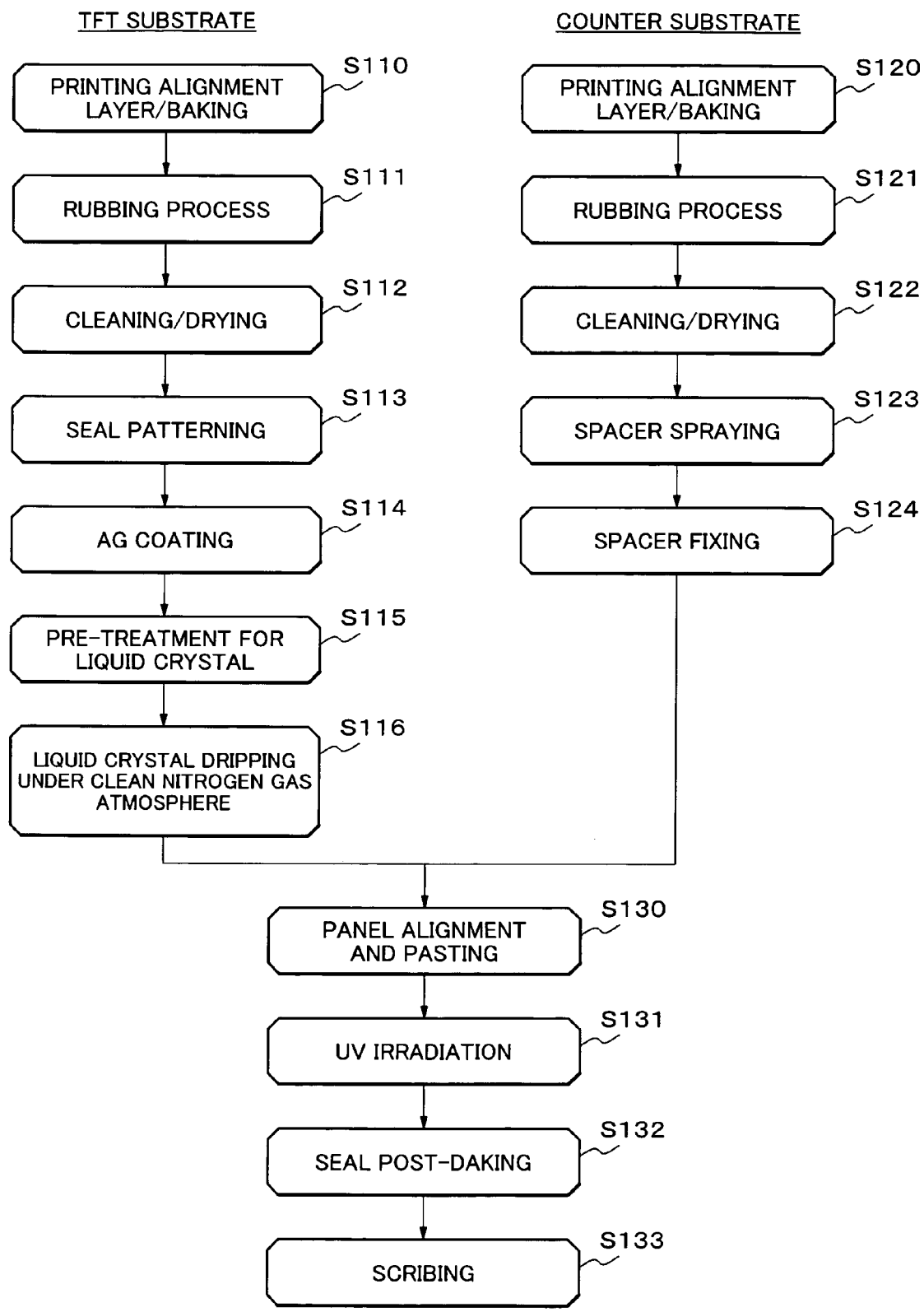
FIG. 1 is a figure of flow showing a part of manufacturing process of the liquid crystal display panel by the liquid crystal dripping and panel pasting method in one embodiment of the present invention.

As the related art denoted, in order to suppress an occurrence of the display fault of the liquid crystal display panel, it is important to remove residual moisture, gas constituents, and foreign substances, such as dusts, from the liquid crystal sandwiched by the substrates of the pair which opposes.

In the liquid crystal filling method, residual moisture and gas constituents are removed by vacuum treatment and foreign substances, such as dusts, are removed by the liquid crystal filling port which has a fine hole. By the liquid crystal dripping and panel pasting method, since the liquid crystal is directly dripped on the substrate, even if residual moisture and gas constituents were removed by vacuum treatment, it still has the problem that foreign substances, such as dusts, are remained in the liquid crystal. Also, even if filtration treatment is performed at the time of a refinement of the liquid crystal, new foreign substances may mix in subsequent manufacture processes of the liquid crystal or the liquid crystal display panel. Therefore, foreign substances, such as dusts, remained in the liquid crystal sandwiched by the paired substrates which opposes, as a result, display faults, such as a luminous dot, occurred, and there was a problem of reducing display quality and a yield.

Therefore, to use the liquid crystal dripping and panel pasting method for manufacturing the liquid crystal display panel, it is necessary to carry out filtration treatment in the manufacture process. And, the arrangement of the filter unit differs depending on what kind of foreign substances are to be removed, and also if filtration treatment is not carried out in a suitable processing step, foreign substances may newly mix even after the filtration treatment. The filtration treatment for preventing contamination of foreign substances is to be performed at the suitable processing step where the possibility that foreign substances may mix is high, otherwise contamination of foreign substances in the liquid crystal cannot be prevented even if the filtration treatment is performed.

In an introduction of the filtration treatment, it is important to perform the filtration treatment in the suitable combination with other treatment, such as vacuum treatment, to achieve effective removal of all kind of substances which may cause the display fault.

For this purpose, the inventor of the present invention collected filters which were used for filtration treatment, washed with organic solvent, analyzed components resolved in the organic solvent to specify the foreign substances which may cause the display fault, and determined the suitable arrangement of the filter unit based on the analysis result. And in order to remove effectively the majority of substances which cause the display fault, it examined what kind of treatment should be combined with this filtration treatment, and the method of the present invention was created.

In the concrete, prior to drip the liquid crystal on the substrate, perform the pre-treatments which suitably combining the vacuum treatment, which maintains the liquid crystal in a decompressed environment and removes residual moisture and gas constituents, the filtration treatment, which removes foreign substances, such as dusts, using the filter unit provided with the filter of predetermined bore diameter, or the filter of predetermined bore diameter with the ion adsorbing member, and as required, the heat treatment, which heats the liquid crystal in ordinary atmosphere pressure state or a decompressed environment and carries out distributed removal of the organic substance.

It also has been found that not only residual moisture or gas constituents but foreign substances, such as dusts, can be removed effectively by driving the liquid crystal discharging unit of the liquid crystal dripping device, which carries out discharging of a fixed quantity of liquid crystal, in the pure gas atmosphere from which moisture and foreign substances have been removed.

It also has been found that the foreign substances mixed in the manufacturing stage of the liquid crystal or the liquid crystal display panel can be removed effectively by providing the filter unit containing the above-mentioned filter or the filter with the ion adsorbing member in the transportation route of the liquid crystal between the container which stores the liquid crystal in the liquid crystal dripping device, and the nozzle which drips the liquid crystal on the substrate, (it is preferable to provide the filter unit between the container and the liquid crystal discharging unit).

Hereafter, with reference to drawings, the concrete method and the concrete arrangement of the liquid crystal dripping device according to the present invention will be explained in full detail.

With reference to FIG. 1 through FIG. 6, the manufacturing method of the liquid crystal display panel and the liquid crystal dripping device according to one embodiment of the present invention will be described.

FIG. 1 is a figure of flow showing a part of manufacturing process of the liquid crystal display panel in one embodiment of the present invention, and FIG. 2A through FIG. 2D are the figures of flow showing four examples of the pre-treatments process in it.

Figure 3:
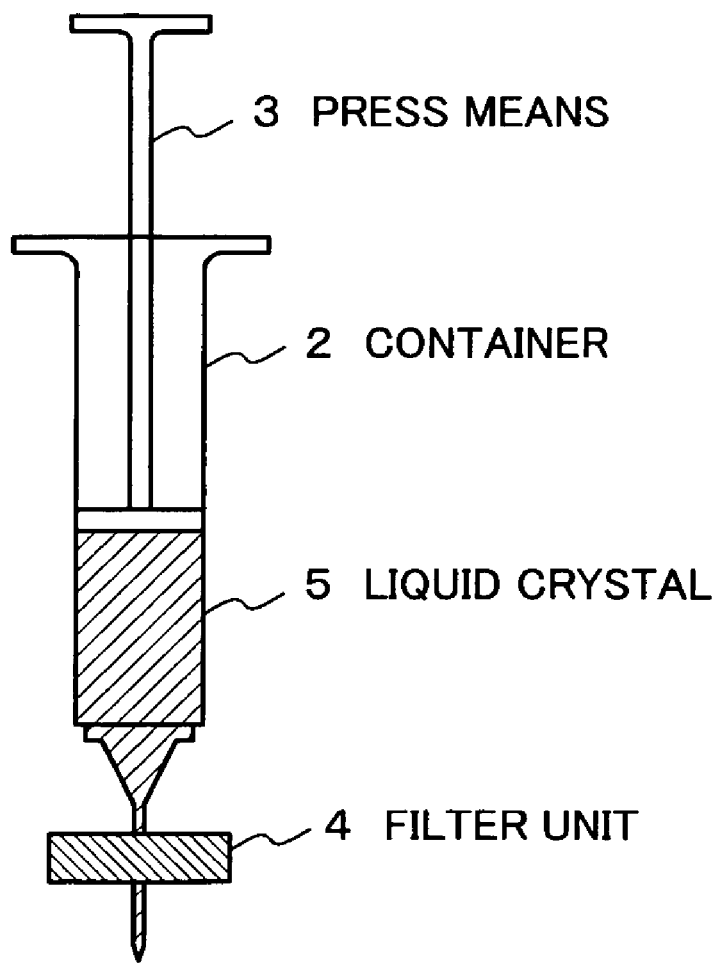
FIG. 3 is a constitutional diagram showing schematically arrangement of a filtration treatment machine which comprised one embodiment of the present invention with the filter unit.
Figure 4:
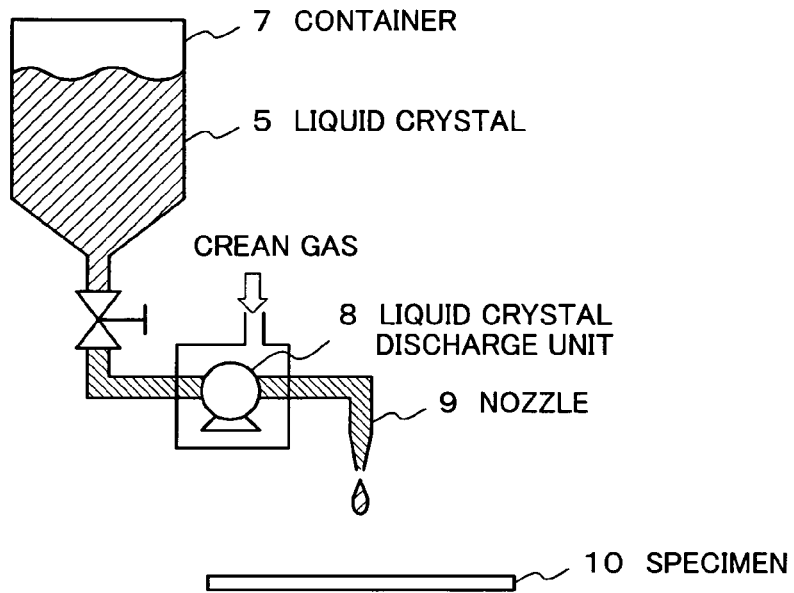
FIG. 4 is a constitutional diagram showing schematically arrangement of a liquid crystal dripping device which comprised one embodiment of a present invention with the filter unit.
Figure 5:
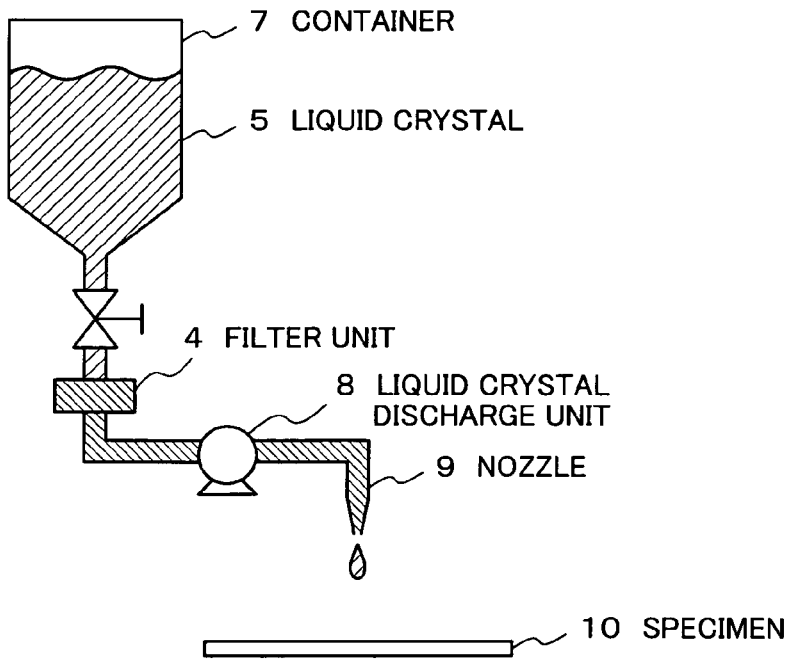
FIG. 5 is a constitutional diagram showing schematically other arrangement of a liquid crystal dripping device which comprised one embodiment of the present invention with the filter unit.

FIG. 3 is a figure showing the arrangement of the filtration treatment device of the embodiment schematically, and FIG. 4 and FIG. 5 are figures showing schematically the arrangement of the liquid crystal dripping device of the embodiment.

Figure 6:
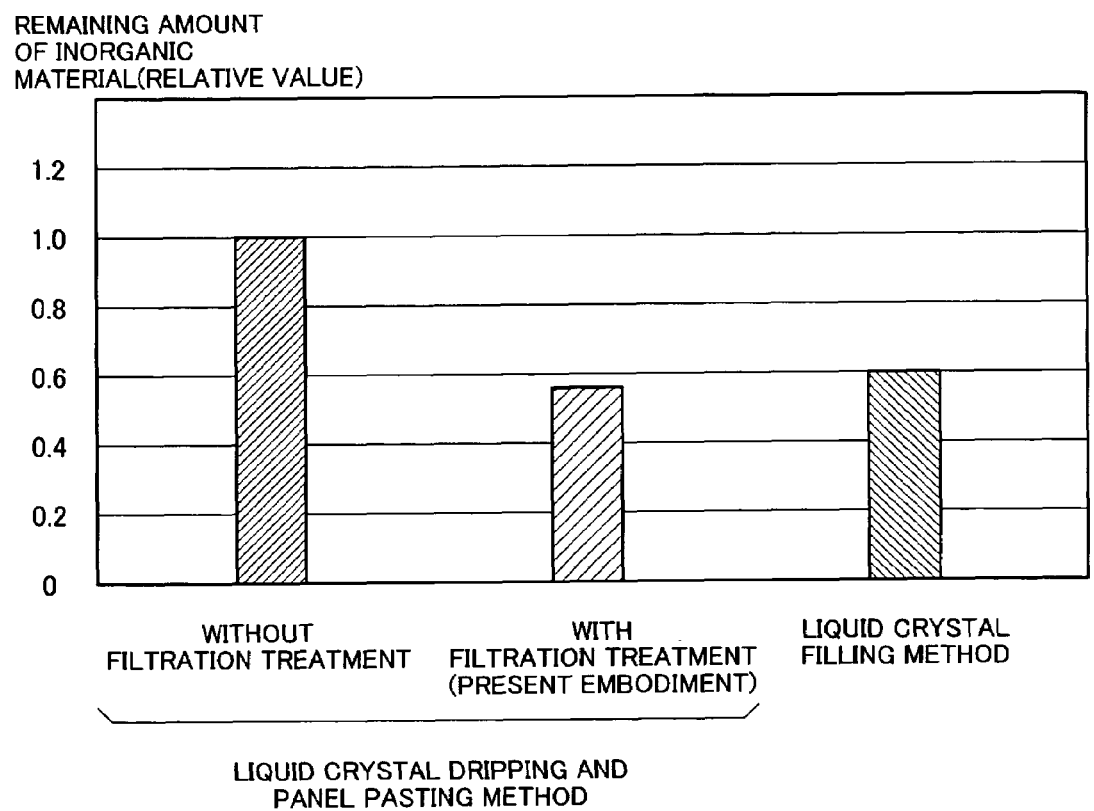
FIG. 6 is a figure for describing an advantageous effect of the present invention, and is a figure showing respective values of foreign substances remained in the liquid crystal of the liquid crystal display panel manufactured by the liquid crystal dripping pasting method and the liquid crystal filling method.
Figure 7:
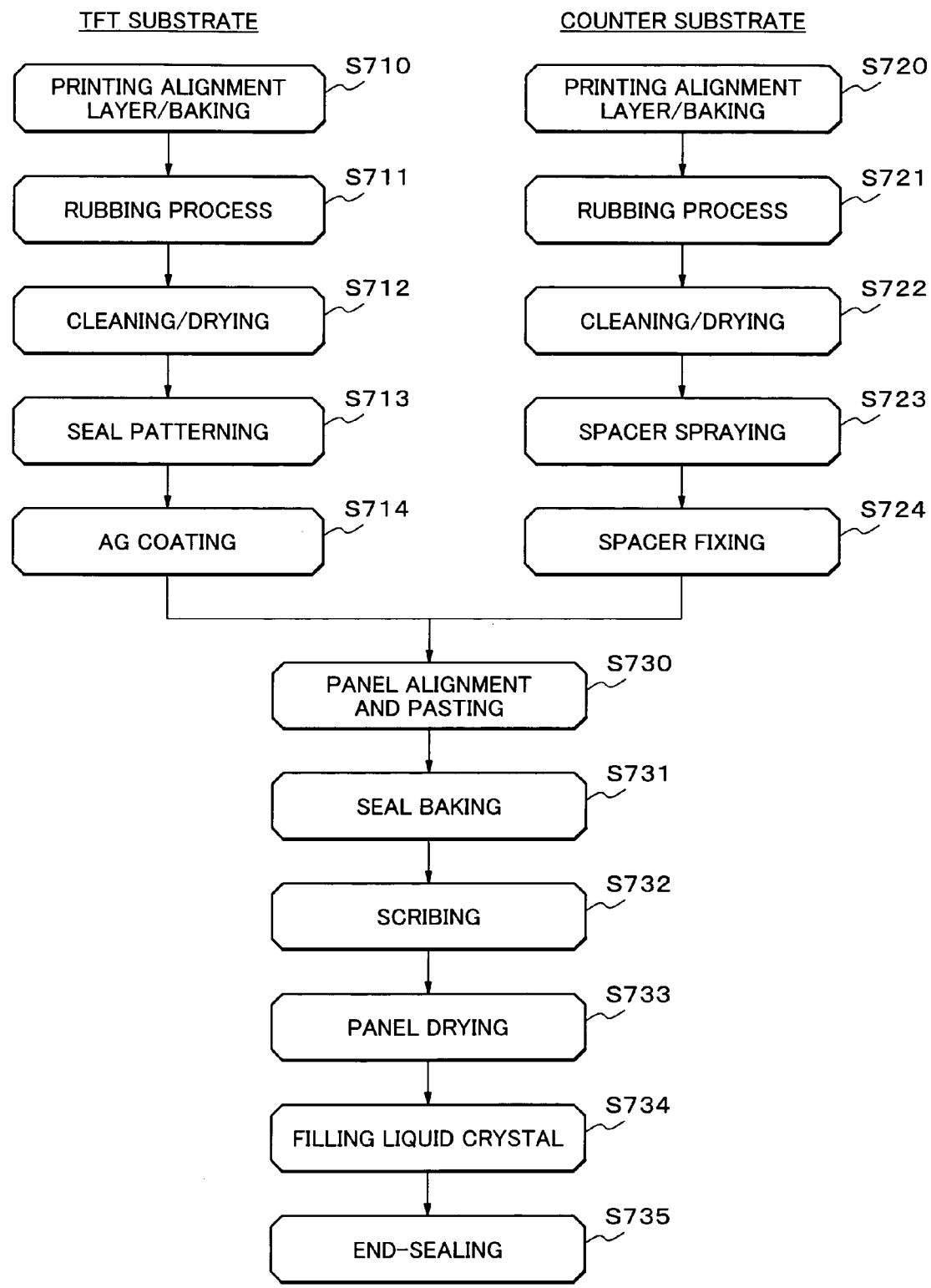
FIG. 7 is a figure of flow showing a part of manufacturing process of the liquid crystal display panel by the conventional liquid crystal filling method.
Figure 8:
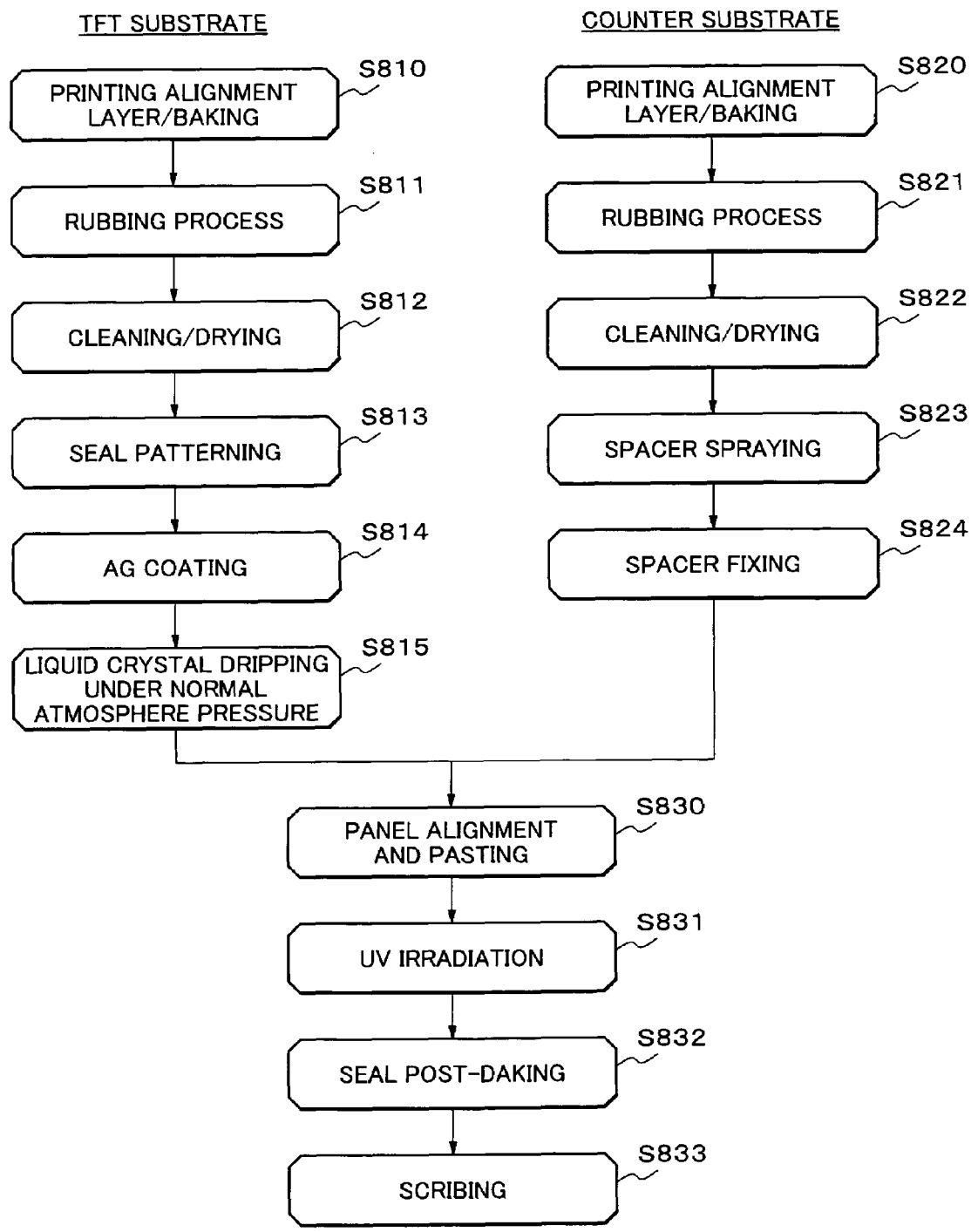
FIG. 8 is a figure of flow showing a part of manufacturing process of the liquid crystal display panel by the conventional liquid crystal dripping and panel pasting method.

FIG. 6 is a figure for describing the effect of the embodiment.

In general, the liquid crystal display panel has the TFT substrate by which switching elements, such as TFT, are formed in matrix form, and the counter substrate in which the color filter, the black matrix, etc. are formed, and the alignment layer with which alignment processing has been performed is formed on the respective opposite surfaces of these substrates. And, insulating spacers, such as polymer beads and silica beads of predetermined configuration have been arranged between both substrates and the predetermined gap is formed, and the alignment direction of the liquid crystal filled in the gap is controlled by the electric field, which is generated by the electrode formed on at least one substrate, to display an image.

Therefore, if air bubbles and foreign substances mix into the liquid crystal, display fault will occur and the display quality of the liquid crystal display panel will be reduced. Therefore, in this embodiment, the liquid crystal display panel is manufactured by the method shown in FIG. 1 and FIG. 2A through FIG. 2D by which not only moisture and gas constituents mixed into the liquid crystal, but also the foreign substances mixed in the manufacture process of the liquid crystal or the liquid crystal display panel are assuredly removed.

With reference to FIG. 1 and FIG. 2A through FIG. 2D, each step of manufacturing the liquid crystal display panel will be described below.

First, by using a printer, provides coating with solution of polyimide, diluted with an organic solvent, as material of the alignment layer on a surface of the TFT substrate on which switching elements, such as TFT, are formed in matrix form and also on a surface of a counter substrate on which a color filter, a black matrix, etc. are formed.

After carrying out pre-baking at the temperature of around 80 degrees C using heating equipment such as a hot plate oven, an IR oven, etc. and drying an organic solvent, performs main baking for carrying out heating dehydration condensation of the polyimide coating film, and forms the alignment layer of uniform thickness (S110, S120).

Next, rubbing process is to be performed for the respective alignment layers on both substrates by a rubbing roller which rubs over the surface of the alignment layer in a same direction for controlling the original alignment direction (pre-tilt angle) of the liquid crystal by a rubbing cloth such as cotton cloth and rayon cloth (S111, S121).

Next, in order to remove the residue, such as textiles waste of the rubbing cloth, and shavings of the alignment layer, on the surface of the substrate, the respective substrates are washed by ultrasonic cleaning, jet spray cleaning, which uses warm ultra-pure water or alcohol. Then, dries the washed substrates with an infrared heating (S112, S122).

Next, using the dispenser drawing method, forms the seal patterning, at 0.3-0.4 mm in width, and about 30-40 micrometers in altitude, for example, with the ultraviolet curing resin or the heat curing resin on one of the substrates, which a pair of substrates opposing each other, (for example; TFT substrate) to specify the area for containing the liquid crystal in it (S113). As for this seal material, the hybrid type which mixed ultraviolet curing type resin and the heat curing type resin can be used, and it is not limited the dispenser drawing method to forms the seal patterning, but screen printing method, etc. may be used.

Then, the AG coating is provided to the TFT substrate in order to perform the conductivity of the inter-electrode of the TFT substrate and the counter substrate (S114).

Spray spacers, such as polymer beads or silica beads to be used for controlling the gap between substrates, to the display area of the other substrate of the pair substrates (here counter substrate) by the spacer sprayer with wet type method, which sprays the solution mixing spacers to solvents, such as water and alcohol, or dry type method, which sprays fine-particles-like spacers directly by airflow of pressure dry nitrogen (S123). In the wet type method, spacers are fixed on, the substrate by aridity removal of the solvent (S124).

Next, it goes to the step which drips the liquid crystal. However in this embodiment, the liquid crystal is to be pre-treated before that.

Here, one of the following methods is used for treating the liquid crystal in the manufacturing method of the conventional liquid crystal display panel. One method is that the subdivided container in which the liquid crystal was sealed in advance is opened, transfers to the container for dripping, and be dripped as it is. Another method is that the liquid crystal transferred from the subdivided container to the container for dripping is placed into the vacuum chamber, maintained in a decompressed environment for removing the residual moisture and gas constituents, and after this, the liquid crystal is used for dripping. Therefore, the foreign substances, which mixed in the manufacturing process of the liquid crystal, and also mixed in the process of the liquid crystal dripping for manufacturing the liquid crystal display panel, cause display fault in the conventional manufacturing method.

Therefore, in this embodiment, the pre-treatments which performs not only the above-mentioned vacuum treatment but also the filtration treatment and the heat treatment in suitable combination as required is applied to the liquid crystal to be used so that not only residual moisture and gas constituents but the above-mentioned foreign substances currently mixed into the liquid crystal can also be removed assuredly (S115).

Describing concretely, the vacuum treatment is the process that the liquid crystal is placed into the vacuum chamber and decompressing the vacuum chamber to 1 or less Torr to remove the residual moisture and gas constituents melted into the liquid crystal. It is not limited in particular a degree of vacuum, an hour to decompress, etc. of this reduced pressure. A vacuum chamber may be a container for vacuum treatment purpose only, and when it is a structure which the liquid crystal dripping device itself can decompress, it may use the liquid crystal dripping device as a vacuum chamber.

The filtration treatment performs to remove the solid-state components of the size more than the bore diameter of filter by using the filter which has the predetermined bore diameter produced by PTFE (Poly Tetra Fluoro Ethylene resin) which is tolerant to the liquid crystal, or moreover to absorb the solid-state components ionized using the ion adsorbing members, such as ion exchange resin.

An example of filtration treatment is shown in FIG. 3. However, it is not limited the realization means in particular.

The filtration treatment device 1 consists of the filter unit 4 provided with a filter or a filter with an ion adsorbing member attached at the tip of the appliance which consists of press means 3 for pushing out the liquid crystal 5 filled in the container 2. The shape of this filter unit 4 and the arrangement filter and the ion adsorbing member are arbitrary. The bore diameter of the filter should just be size (for example, about 4-5 micrometers or less) smaller than the gap between the substrates of the pair. When it considers removing assuredly the foreign substances which affects display quality, it is favorable to be referred to as about 0.5 micrometer or less.

The heat treatment is processing which heats the liquid crystal at the temperature of about 100 degrees C. or more, and carries out distributed removal of the residual organic substance in the liquid crystal (for example, fraction of the lid of a subdivided container etc.). It is not limited in particular temperature, heating time, etc. of this heat treatment. The heating device can also use a device, such as a hot plate or an oven. Moreover, the vacuum heat treatment which heats within vacuum devices is also useful to prevent moisture and gas constituents from melting into the liquid crystal again after the heat treatment.

And, not only the residual moisture and gas constituents mixed into the liquid crystal but foreign substances, such as dusts, are assuredly removable by combining the heat treatment or the vacuum heat treatment as required with the vacuum treatment and the filtration treatment.

It can be set up suitably how these treatments are to be combined considering the type of the substance to be removed, the manufacturing process and the function of the manufacturing equipment.

Figure 2A:
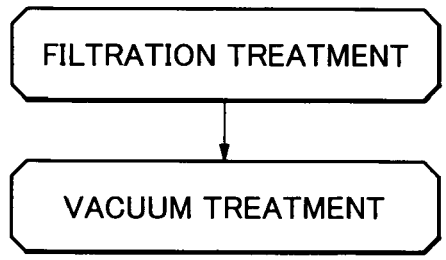
FIG. 2A is a figure of flow showing an example of the pre-treatments process in the manufacturing process of the liquid crystal display panel by the liquid crystal dripping and panel pasting method in one embodiment of the present invention.

For example, FIG. 2A shows the example which performs the filtration treatment prior to the vacuum treatment. The filter or the filter with the ion adsorbing member is used at the time when transferring the liquid crystal to the container for dripping from the subdivided container. After this filtration treatment, the vacuum treatment is performed inside the vacuum chamber or the liquid crystal dripping device.

Figure 2B:
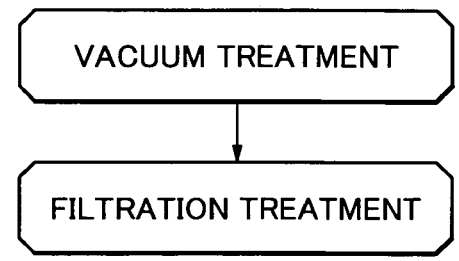
FIG. 2B is a figure of flow showing another example of the pre-treatments process in the manufacturing process of the liquid crystal display panel by the liquid crystal dripping and panel pasting method in one embodiment of the present invention.

FIG. 2B is another example which performs the filtration treatment after the vacuum treatment. After the vacuum treatment has completed, the filter or the filter with the ion adsorbing member is used to perform the filtration treatment at the time when transferring the liquid crystal to the container for dripping.

Figure 2C:
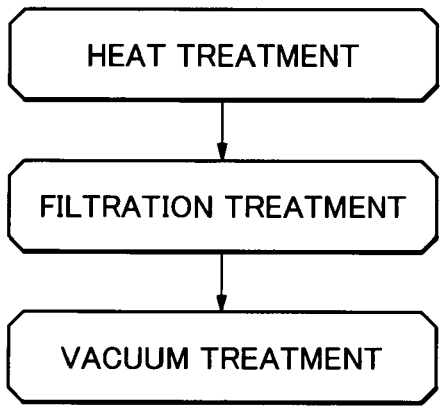
FIG. 2C is a figure of flow showing another example of the pre-treatments process in the manufacturing process of the liquid crystal display panel by the liquid crystal dripping and panel pasting method in one embodiment of the present invention.

FIG. 2C shows the example which performs the heat treatment prior to the filtration treatment, and the vacuum treatment is performed after the filtration treatment has been completed.

Figure 2D:
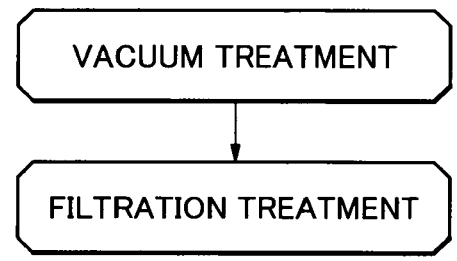
FIG. 2D is a figure of flow showing another example of the pre-treatments process in the manufacturing process of the liquid crystal display panel by the liquid crystal dripping and panel pasting method in one embodiment of the present invention.

FIG. 2D is the example which performs the vacuum heat treatment which heats the liquid crystal in a reduced pressure environment prior to the filtration treatment.

Back to FIG. 1, the next step to be performed is that the proper quantity of liquid crystal is dripped onto the predetermined area sectioned by the seal material of the TFT substrate by using the liquid crystal dripping device (S116) The proper quantity of liquid crystal means that the enough amount of the liquid crystal to fill the gap between substrates when the seal material is crushed to paste the counter substrate together in a later processing step.

Here, the conventional liquid crystal dripping device comprises the container which stores the liquid crystal, the liquid crystal discharging unit like a transfer pump which discharges the proper amount of liquid crystal from the container, and the nozzle which drips the discharged liquid crystal onto the substrate. Since the conventional liquid crystal discharging unit is placed at the working environment, it has the problem that moisture and foreign substances mix into the liquid crystal inside the liquid crystal discharging unit from the working environment.

Therefore, in this embodiment, in order to prevent moisture and foreign substances from mixing into the liquid crystal at the liquid crystal dripping step, the next countermeasures are taken.

As shown in FIG. 4, the liquid crystal discharging unit 8 is covered with a container, and introduces pure gas, such as nitrogen gas from which moisture and foreign substances have beforehand been removed, into the container by the pressure of about 1 or more KPa. The liquid crystal discharging unit 8 is driven in the pure gas atmosphere, and the liquid crystal 5 in the liquid crystal discharging unit 8 is not exposed to the working environment.

Although this processing may be performed solely, it is preferable to perform this processing with the pre-treatments mentioned above for preventing more assuredly moisture and foreign substances from mixing into the liquid crystal.

Next, carries out alignment of the TFT substrate and the counter substrate so that the surface of the TFT substrate on which the liquid crystal has been dripped and the surface of the counter substrate on which the spacers have been sprayed face each other, and pastes them together (S130).

Then, the ultraviolet ray is glared from the back of the TFT substrate, and curing the seal material temporarily (S131). After that, crushes the seal material from the outside of both substrates, for example, applying about 0.1N/mm2 load. And, the paired substrates pasted together are baked, and performs main curing the seal material and keeps the liquid crystal in the gap between the substrates (S132).

Then, cuts the pair of substrates (TFT substrate and counter substrate) pasted together at the predetermined portion of the seal material, and the manufacturing of liquid crystal display panel is completed (S133).

In the flow described using the above-mentioned FIG. 1, the filtration treatment of the liquid crystal is individually performed by using the filtration treatment device. Therefore, the individual step for filtration treatment must be performed in this method, and it can be possible that foreign substances mix again into the liquid crystal when transferring the liquid crystal, to which the filtration treatment has been completed, to the container of the liquid crystal dripping device.

In order to eliminate such a possibility, it may provide the filter unit in the liquid crystal dripping device itself to remove foreign substances at the liquid crystal dripping device.

For example, as shown in FIG. 5, the filter unit 4 provided with the filter of predetermined bore diameter or this filter with the ion adsorbing member is attached between the container 7 and nozzle 9 (preferably between the container 7 and liquid crystal discharging unit 8). By this arrangement, the liquid crystal 5 discharged from the container 7 penetrates the filter unit 4, and be dripped from nozzle 9. As the result, the foreign substances mixed in the liquid crystal can be removed assuredly, without adding the filtration treatment step separately.

The above-mentioned explanation is an example of the manufacturing method of the liquid crystal display panel of this embodiment, and the processing condition and processing order of steps other than the pre-treatments of the liquid crystal of FIG. 1 (step S115) and dripping processing of FIG. 1 (step S116), processing order can be set up arbitrarily, and may add other steps other than the above if needed.

Although FIG. 1 and FIG. 2A through FIG. 2D show the case where the seal patterning is formed on the TFT substrate and the liquid crystal is dripped on that area and spacers are sprayed onto the counter substrate, it may opposite that the seal patterning is formed on the counter substrate and spacers are sprayed onto the TFT substrate. And, it is also possible that the spacers are sprayed as well as the seal patterning is formed (or the seal material in which the spacers are mixed can be applied) on one substrate (here TFT substrate).

FIG. 6 is a figure for describing an advantageous effect of the present invention, and is a figure showing respective values of foreign substances remained in the liquid crystal of the liquid crystal display panel manufactured by the liquid crystal dripping pasting method and the liquid crystal filling method. The inventor of the present invention conducted the following experiment to confirm the effect of the present invention. In the next, the experiment and the result will be described with referring to FIG. 6.

The specimens of liquid crystal were extracted from each of the liquid crystal display panels (the quantity of liquid crystal per unit area at the center part of the display panel was extracted) manufactured by the liquid crystal dripping and panel pasting method and the liquid crystal filling method respectively. And, two kinds of specimen are extracted in case of the liquid crystal dripping and panel pasting method, one is the case where the filtration treatment has applied and the other is the case where the filtration treatment has not applied in the manufacturing steps. And, each specimen was analyzed and measured the foreign substances (inorganic system substances) contained in the specimen.

The result is shown in FIG. 6. FIG. 6 shows the relative value of the inorganic system substances, such as Na and K, contained in each specimen, and the amount of each specimen is the quantity of liquid crystal per unit area extracted at the center part of the display panel.

The amount of the inorganic system substance contained in the specimen (hereinafter "specimen 1") extracted from the liquid crystal display panel manufactured by the liquid crystal dripping and panel pasting method and the case where the filtration treatment has not applied in the manufacturing processes is set to "1" (left hand side of the figure). The relative value of the inorganic system substances contained in the specimen (hereinafter "specimen 2") extracted from the liquid crystal display panel manufactured by the liquid crystal dripping and panel pasting method and the case where the filtration treatment has applied is shown in center of the figure, and the relative value of the inorganic system substances contained in the specimen (hereinafter "specimen 3") extracted from the liquid crystal display panel manufactured by the liquid crystal filling method is shown in the right had side of the figure respectively.

As shown in FIG. 6, it is understood that the relative value of the inorganic system substances measured in the specimen 2 (center of the figure) is reduced to 60 or less percent compared with that of measure in the specimen 1 (left hand side of the figure), and moreover, the relative value of the inorganic system substances measured in the specimen 2 is less than that of measured in the specimen 3 (the right had side of the figure).

By these result, it has confirmed that the filtration treatment of the present invention has the effect to remove the foreign substances as the same or more level as the liquid crystal filling method, even when a liquid crystal dripping and panel pasting method is used.

Thus, according to the manufacturing method of the liquid crystal display panel and the liquid crystal dripping device of the present invention, moisture, gas constituents and foreign substances, such as dusts, mixed in the liquid crystal in the manufacture process of the liquid crystal or the manufacture process of the liquid crystal display panel, are assuredly removable.

This is because the pre-treatments is performed before dripping the liquid crystal, such as the vacuum treatment which removes the residual moisture and gas constituents mixed into the liquid crystal, the filtration treatment which removes the foreign substances mixed into the liquid crystal using the filter of the predetermined bore diameter or the filter with the ion adsorbing member, and if needed, combining with these treatments, the heat treatment is also performed to carry out distributed removal of the organic substances mixed into the liquid crystal.

It is also effective to keep the liquid crystal clean that the liquid crystal discharging unit in the liquid crystal dripping device is driven in a pure gas atmosphere when the liquid crystal is dripped.

It is further effective to remove the foreign substances, such as dusts mixed in the liquid crystal assuredly that the filter unit provided with the filter of the predetermined bore diameter or the filter with the ion adsorbing member in the liquid crystal dripping device.

According to these effects, the liquid crystal display panel manufacturing method and the liquid crystal dripping device of the present invention can achieve to manufacture the liquid crystal display panel with high quality in which luminous dots or bright defects are eliminated, and also improve the yield of the manufacture.

Although the pre-treatments of the liquid crystal and the liquid crystal dripping step are applied to the TFT substrate in this embodiment, it has the same advantageous effects of the present invention as above even if the steps of S113-S116 of FIG. 1 are applied to the counter substrate (not the TFT substrate) on which the light filter, the black matrix, etc. are formed.

The manufacturing method of the liquid crystal display panel and the liquid crystal dripping device of the present invention can be applicable to any manufacturing method of the liquid crystal display panel as far as the display panel is the structure of sandwiching the liquid crystal between two substrates which oppose. Therefore, it is apparent that the manufacturing method of the liquid crystal display panel and the liquid crystal dripping device of the present invention can be applied to the manufacturing process of the liquid crystal display panels, such as the liquid crystal display panel of the TN system which provides a clear electrode in each substrate and drives the liquid crystal by the electric field of the longitudinal direction between substrates, the liquid crystal display panel of the IPS (In-plane Switching) system which provides a comb shaped electrode in one substrate and drives the liquid crystal by the electric field between each electrode, and other liquid crystal display panels, which becomes a white state without voltage, so called 'normally white' and which becomes a black state without voltage, so called 'normally black'.

The previous description of embodiments is provided to enable a person skilled in the art to make and use the present invention. Moreover and various modifications to these embodiments will be readily apparent to those skilled in the art and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further and it is noted that the inventor's intent is to refrain all equivalents of the claimed invention even if the claims are amended during prosecution.

What is claimed is:

1. A liquid crystal dripping device for manufacturing a liquid crystal display panel which drips liquid crystal onto one of substrates of a pair, and pastes said substrate and another substrate of the pair together using a seal material, said device comprising:
   a closed housing for performing in a series of pre-treatment steps prior to said dripping of said liquid crystal onto one of said substrates, wherein said housing comprises a heating element for vacuum heat heating said liquid crystal in a decompressed environment to remove organic substances mixed in said liquid crystal, and is arranged to maintain said liquid crystal in a vacuum state for removing moisture or gas constituents mixed in said liquid crystal, and a filtration system comprising a filter having a bore diameter of 0.5 micrometer at most and an ion adsorbing member for removing foreign substances mixed in said liquid crystal;
   a liquid crystal discharging unit connected to said closed housing and arranged to drip said liquid crystal, after said series of pretreatment has been applied thereto, onto one of said substrates, wherein said liquid crystal discharging unit is covered with a container in which pure nitrogen gas is introduced, and said liquid crystal discharging unit is provided with a filtration system comprising a filter having a bore diameter of 0.5 micrometer at most and an ion adsorbing member for removing foreign substances mixed in said liquid crystal during said dripping of said liquid crystal.

2. The liquid crystal dripping device according to claim 1, wherein
   a temperature for heating said liquid crystal by said vacuum heat treating means is at least 100° C.; and
   a vacuum state for maintaining said liquid crystal in the liquid crystal dripping device by said vacuum treating means is at most 1 Torr.

3. The liquid crystal dripping device according to claim 1, wherein
   a pressure of said pure nitrogen gas to be introduced in said container by said liquid crystal dripping means is at least 1 KPa.

* * * * *